Sept. 26, 1939.  W. S. REYNOLDS  2,173,860
PACKAGING MACHINE
Filed Aug. 7, 1935  11 Sheets-Sheet 1

FIG. 1

INVENTOR.
WARREN S. REYNOLDS
BY
ATTORNEY

Sept. 26, 1939. W. S. REYNOLDS 2,173,860
PACKAGING MACHINE
Filed Aug. 7, 1935 11 Sheets-Sheet 2

INVENTOR.
WARREN S. REYNOLDS
BY

ATTORNEY

Sept. 26, 1939.  W. S. REYNOLDS  2,173,860
PACKAGING MACHINE
Filed Aug. 7, 1935  11 Sheets-Sheet 3

FIG. 2A

INVENTOR.
WARREN S. REYNOLDS
BY 
ATTORNEY

Sept. 26, 1939.  W. S. REYNOLDS  2,173,860
PACKAGING MACHINE
Filed Aug. 7, 1935   11 Sheets-Sheet 4

FIG. 2B

INVENTOR.
WARREN S. REYNOLDS
BY
ATTORNEY

Sept. 26, 1939.    W. S. REYNOLDS    2,173,860
PACKAGING MACHINE
Filed Aug. 7, 1935    11 Sheets-Sheet 9

INVENTOR.
WARREN S. REYNOLDS
BY 
ATTORNEY

Sept. 26, 1939. W. S. REYNOLDS 2,173,860
PACKAGING MACHINE
Filed Aug. 7, 1935 11 Sheets-Sheet 10

INVENTOR.
WARREN S. REYNOLDS
BY
ATTORNEY

Sept. 26, 1939.　　　W. S. REYNOLDS　　　2,173,860
PACKAGING MACHINE
Filed Aug. 7, 1935　　　11 Sheets-Sheet 11

INVENTOR.
WARREN S. REYNOLDS
BY
ATTORNEY

Patented Sept. 26, 1939

2,173,860

UNITED STATES PATENT OFFICE 2,173,860

PACKAGING MACHINE

Warren S. Reynolds, Stratford, Conn., assignor to Remington Arms Company, Inc., a corporation of Delaware Application August 7, 1935, Serial No. 35,028

12 Claims. (Cl. 226—16)

This invention relates to a machine for arranging small articles for packing into containers, providing for inspection of such articles, and inserting them into their containers. The machine will be described with reference to the arranging and packing of shot shells, but it will be understood that its utility is not limited to this particular field.

The specific objects of the invention will appear from the following description of the purpose and accomplishments of the machine, it being understood that the several parts of the complete machine are capable of use both separately and in conjunction with other mechanisms.

Shot shell loading machines are made to deliver shells loaded and ready for packing in an upright position. These shells comprise flanged heads, and for the purpose of effective packing it is necessary that alternate shells be in reversed position, the head of one shell standing opposite the mouth of adjacent shells. The present machine provides means for receiving shells in an upright position from the loading machine, automatically reversing the position of alternate shells, and delivering the shells thus arranged to an inspection table where they remain aligned and in proper alternate arrangement a sufficient time to permit visual inspection.

From the inspection table the shells are moved in groups, preferably of an odd number, into the containers in which they are to be packed. A row of five shells is slid into the container, the container is then automatically lowered a distance corresponding to the height of the row of shells which has been placed therein, a second row is put in place and the container is again lowered; this operation being repeated until the container is full. The final downward movement of the container stops the operation of the devices which feed shells into the container, permitting the full container to be removed, an empty container put in place, and the container holder restored to its uppermost position. When this has been done, the operator again starts the machine and the filling of the container is repeated. It is desirable that certain identifying legends be printed on the containers as they are filled. For this purpose, means are provided, operating in conjunction with the container filling means, for feeding the containers over a print roll provided with the proper legend and for stopping the print roll and container feeding means with the container filling means.

A representative embodiment of mechanism for accomplishing these purposes is illustrated in the accompanying drawings, in which.

Figure 2:
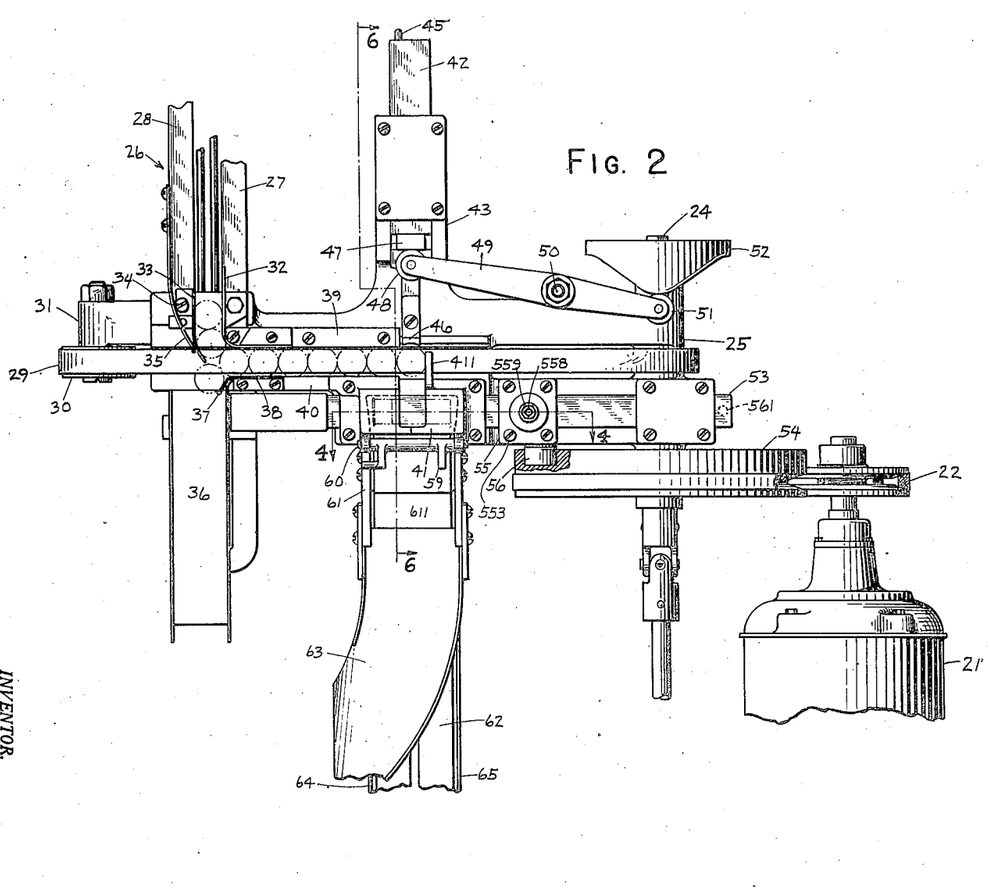
Fig. 2 is a plan view of the part of the machine including the carrier for receiving shells from the loading machine, the shell reversing mechanism, and the driving mechanism.
Figure 2A:
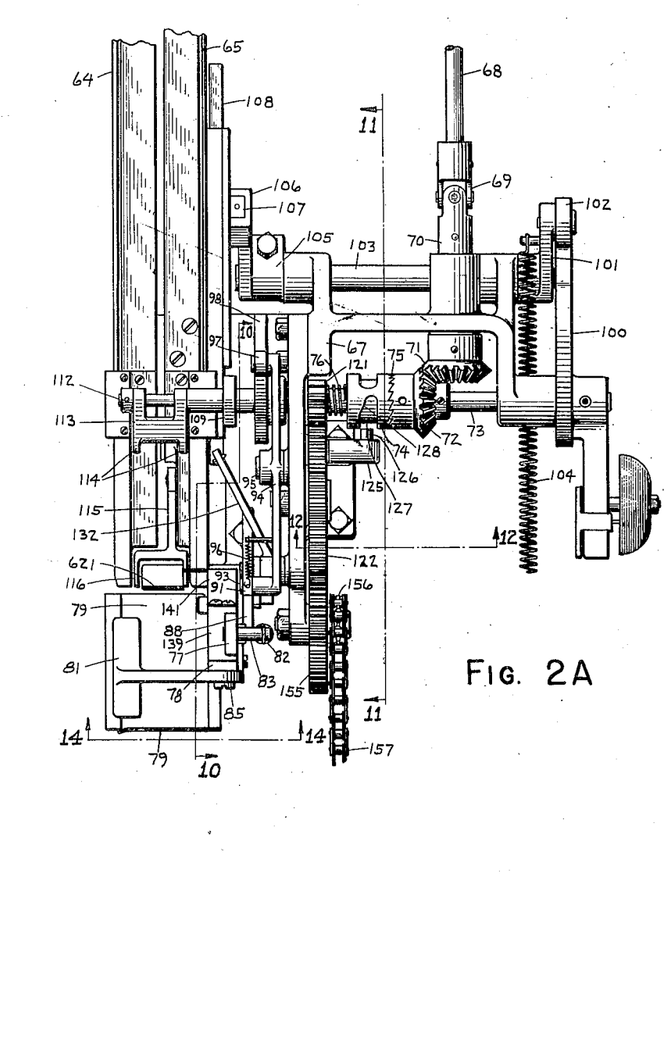
Fig. 2A is a plan view which is substantially a continuation of Fig. 2, a part of the length of the inspection table being omitted. This figure shows in plan the container holder and its operating means, the shell feeding mechanism and its operating means, and the driving devices for these mechanisms.
Figure 3:
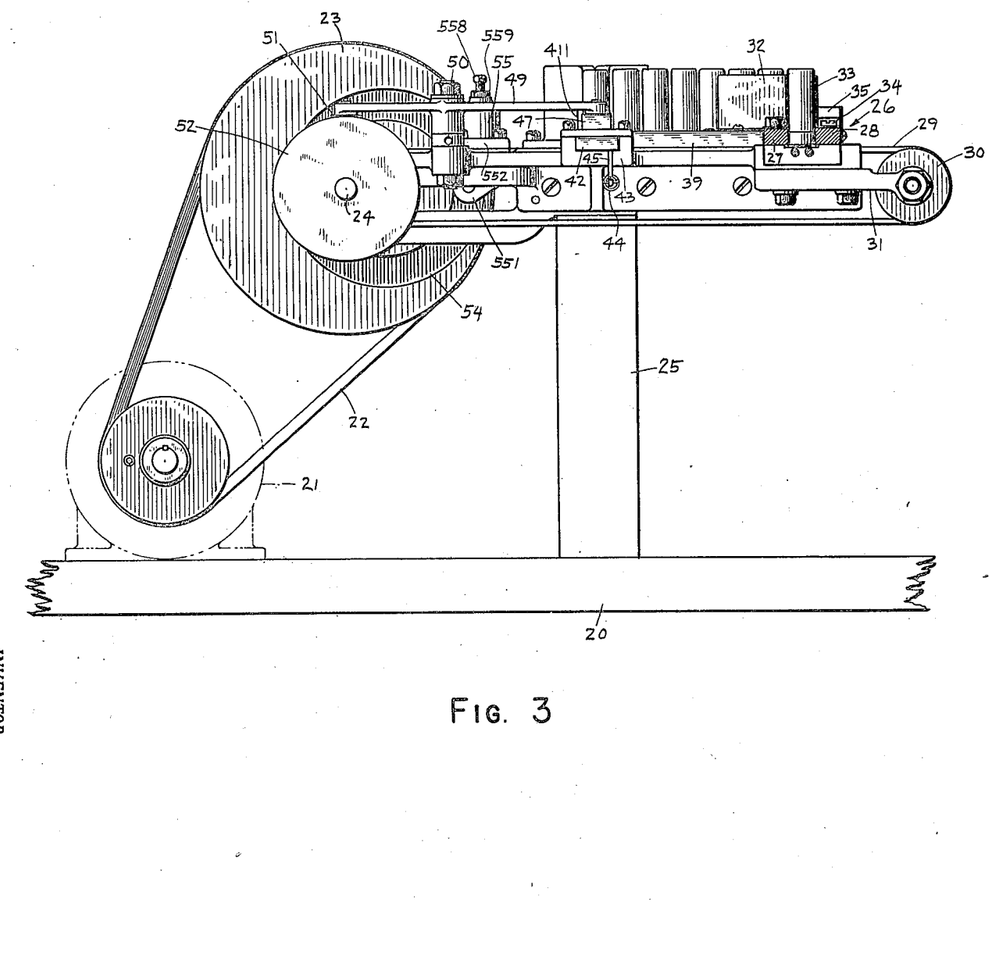
Fig. 3 is an elevation of the mechanism shown at the left end of Fig. 1 looking toward the right.

The machine is preferably mounted on a bench or table 20. Power for the moving parts is secured from a motor 21 which, through a belt 22 and pulley 23, drives a shaft 24. The bearing of shaft 24 is in a casting 25 which supports all parts of the shell receiving and reversing mechanism. Shells are received from the shell loading machine through a trackway identified generally by the numeral 26, said trackway comprising a suitable support and side bars 27 and 28 so spaced from the support as to furnish a channel for receiving shell heads and thus supporting the shells in an upright position, as clearly illustrated in Fig. 3. The trackway 26 communicates with a second trackway extending transversely of the machine and formed in the casting 25. A belt 29 passing over a pulley 30 in an arm 31 of casting 25 and a second pulley on the shaft 24 furnishes a means for moving the shells delivered from the trackway 26. For movement onto the belt 29 the shells are guided between an angle plate 32 secured to the casting 25 and a second upright plate 33 pivoted to the casting 25 at 34 and urged inwardly by a suitable spring, such as 35. The free end of plate 33 is curved inwardly, as illustrated in Fig. 2, to direct shells onto the belt 29. When the movement of shells onto belt 29 is obstructed, as shown in Fig. 2, the plate 33 is swung about its pivot by the shells advancing through trackway 26 and the shells move across the belt 29, the belt sliding under them, and are directed into an outlet chute 36 by the turned end 37 of a guide plate 38 secured to the casting 25 opposite the leg of angle plate 32 which extends parallel to the belt 29. Suitable undercut blocks 39 and 40 secured to the casting 25 furnish a channel for receiving the flanged shell heads, thus holding the shells in an upright position as they are carried along by the belt 29.

Figure 4:
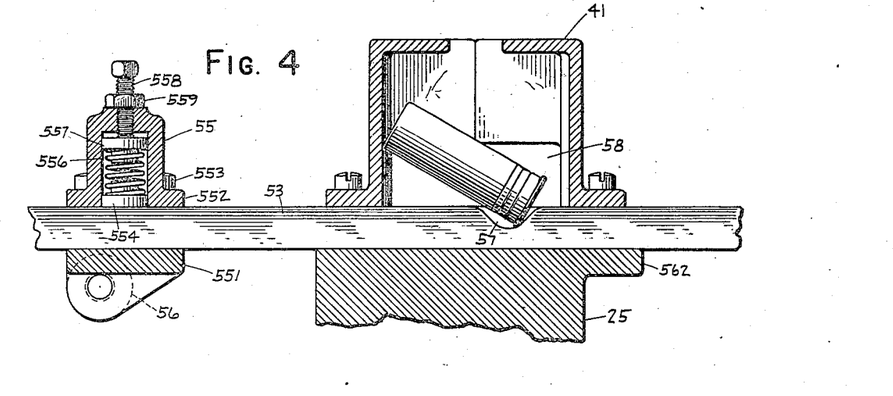
Fig. 4 is an enlarged sectional elevation substantially on the line 4—4 of Fig. 2, the shell reversing bar being shown as moving to the right.
Figure 5:
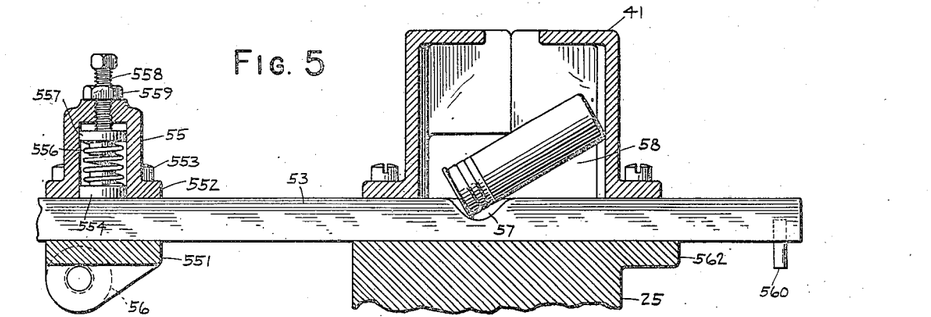
Fig. 5 is a view similar to Fig. 4 but with the shell reversing bar moving to the left.

The shells are moved transversely off from the belt 29 into a reversing chamber identified generally by numeral 41 by means of a pusher 42, being aligned with the pusher by engagement with a stop 411, preferably secured to or integral with the reversing chamber 41. The pusher 42 is supported for rectilinear movement in an arm 43 of casting 25 and is urged forward by a spring 44 tensioned between the arm 43 and a stud 45 extending from the pusher. The pusher comprises an upwardly extending head 46, suitably curved to engage the periphery of a shell, and a lug 47 for engagement by a roller 48 on a lever 49 pivoted at 50 in the casting 25 and actuated through a roller 51 thereon by a cam 52 on the drive shaft 24. Said cam 52 comprises two lever operating lobes so that the pusher 42 is reciprocated twice, delivering two shells to the reversing chamber 41, during each revolution of the shaft 24. In the reversing chamber the two shells thus delivered are placed in a horizontal position, each being reversed with respect to the preceding one, so that the head of each lies opposite the mouths of those adjacent on either side. The mechanism for this purpose may be constructed as follows:

A shell reversing bar 53 (Figs. 2, 4 and 5), suitably supported and guided for rectilinear movement in the casting 25, is reciprocated by a box cam 54 on the drive shaft 24. Said cam may conveniently be formed in the pulley 23 by which shaft 24 is driven. The member connecting the reversing bar 53 with the box cam 54 is identified by the numeral 55 and comprises a laterally extending roller 56 received in the track of the box cam. Member 55 comprises a base block 551 channeled to receive the reversing bar 53 and a cover plate 552 connected to the channel base by suitable means such as screws 553. The dimensions of the channel in the base 551 are such that when the cover is in place the bar 53 slides loosely therein. The cover plate 552 is extended upwardly to form a housing for a friction clutch device comprising a clutch member 554 pressed into engagement with the upper surface of reversing bar 53 by a spring 556. The opposite end of spring 556 abuts a shouldered pilot member 557, the position of which is determined by a tension adjusting screw 558 threaded into the top of the member 552 and held in adjusted position by a lock nut 559. Thus, the connection between the member 55 and the reversing bar 53 is sufficiently rigid to enable said bar to operate on shells in the manner to be described but will slip in the event that a shell becomes jammed and offers excessive resistance to the movement of the bar 53. This is of importance since the application of a crushing force to the shells might result in an explosion.

When the connecting member 55 has thus been displaced upon the bar 53 it is necessary that it be automatically restored to its initial position in order to reciprocate the bar 53 in proper synchronism with the movements of the pusher heretofore described. For this purpose, studs 560 (Fig. 5) and 561 (Fig. 2) extend downwardly from the reversing bar 53 near its ends. Normally these studs just clear the adjacent parts of the frame casting 25 at the ends of the reciprocating movements of bar 53. Should a shell become jammed, for example in the position illustrated in Fig. 5, with the reversing bar moving to the right, the connection member 55 will slide along the bar 53 toward the right. When member 55 reaches the limit of its movement in this direction and starts its reverse movement, it will carry the bar 53 along with it until the stud 560 engages the adjacent surface 562 on the frame casting; thereupon the movement of bar 53 is stopped, and the connecting member again slides on this bar until it assumes its normal position thereon. The reciprocating bar thereafter functions in normal manner without the necessity for any manual readjustment.

The box cam is arranged to reciprocate the reversing bar 53 once during each revolution of shaft 24, while the pusher 42, as heretofore shown, delivers two shells during each revolution of shaft 24. Said shells are moved by the pusher 42 from belt 29 onto the reversing bar 53; thus, when one shell is delivered the pusher will be moving in one direction, say to the right, and when the next shell is delivered it will be moving in the opposite direction. The part of the reversing bar 53 which reciprocates within the reversing chamber 41 is provided with a shell head receiving notch 57. By the engagement of shell heads in this notch successive shells are reversely turned and drop into horizontal positions with the head of each adjacent the mouth of the two adjoining shells.

Figure 6:
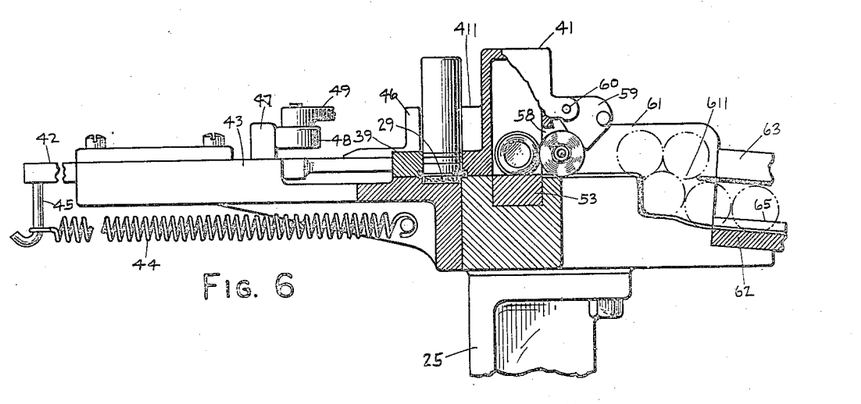
Fig. 6 is a fragmentary elevation, partly in section, substantially on the line 6—6 of Fig. 2, the shell pusher being in retracted position.
Figure 7:
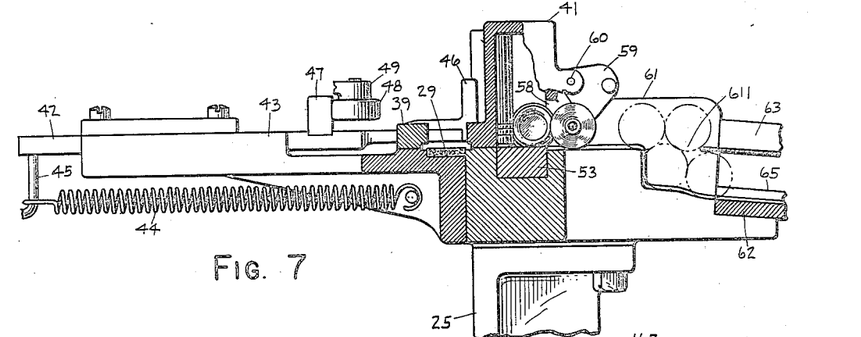
Fig. 7 is a view similar to Fig. 6, the shell pusher being advanced.

The shells thus arranged are delivered from the reversing chamber in a horizontal position through a suitable opening 58 in the back of said chamber, each shell being pushed out as another is advanced into the chamber. A gate 59 pivoted to the chamber at 60 prevents the premature delivery of the shells and serves to hold them as delivered in a position transverse to the short delivery chute 61. Normally the shells thus delivered drop through a gap 611 in the floor of chute 61 onto an inspection table 62. If the inspection table is full, as illustrated in Fig. 6, the last shell thereon partly bridges the gap 611 and additional shells delivered from the reversing chamber are pushed across the gap 611 and delivered through an overflow chute 63 where is preferably turned laterally, as shown in Fig. 2, so that overflow through both chute 63 and chute 36 is directed into the same receptacle. The weighted gate 59 prevents shells in the chute 61 rolling back into the reversing chamber.

Figure 1:
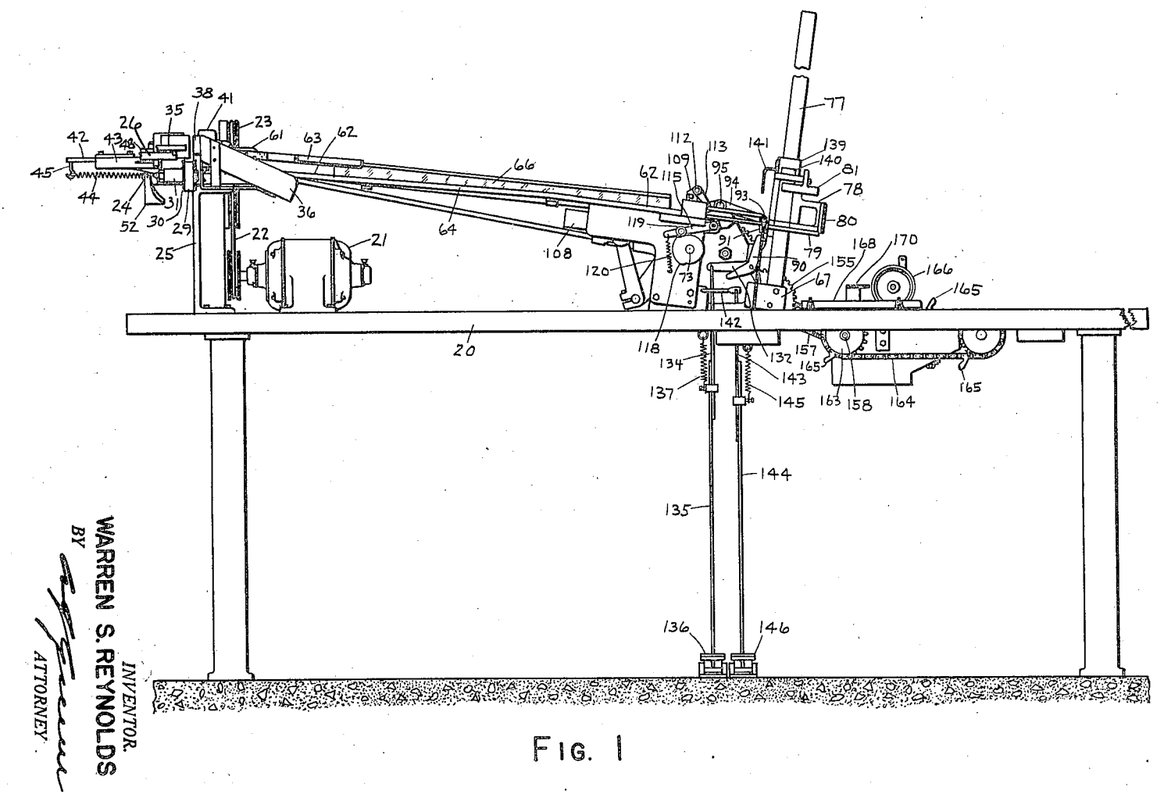
Fig. 1 is a side elevation of the complete machine.

The inspection table 62, which is preferably inclined as illustrated in Fig. 1, is of a width slightly greater than the length of a shot shell and comprises low front and rear guides 64 and 65. Along the back of the inspection table adjacent the guide 65 is a mirror 66 by which the operator at the front of the machine is enabled to fully inspect the row of shells on the table.

Means are provided for delivering shells in groups from the inspection table to a carton or other container suitably held to receive a group of shells, for then moving the container to a position to receive a second group of shells, and for repeating the shell and container movements until the container is full. One form of mechanism for this purpose is illustrated in the drawings, particularly Figs. 2A, 8 to 12, 14, 16, 17 and 18. The mechanism is chiefly supported on a frame or casting 67. The drive shaft 24 is connected through a universal joint with a transmission shaft 68 carrying a second universal joint 69 connecting with a short shaft 70 having a bearing in the casting 67. Fixed to the shaft 70 is a bevel pinion 71 meshing with a bevel gear pinion 72 loosely mounted on a transversely extending shaft 73 to which it is connected by means of a clutch member 74 provided with clutch teeth 75 engaging corresponding teeth on the hub of bevel pinion 72. The clutch member 74 has a spline connection with shaft 73, is urged into the clutch closing position by a spring 76, and is retracted to stop the shaft 73 in a manner to be hereinafter described.

The receptacle holding and moving means is supported and guided for vertical movement upon an upright bar 77 secured to the casting 67. The holder comprises a back indicated generally by the numeral 78 having a part adapted to embrace the bar 70 and guide the holder for vertical movement thereon. A bottom plate 79 and an end plate 80 having inwardly turned edge portions, and a short lip or top plate 801, are secured to the back 78. The frame thus formed receives a container 810 (Fig. 9) which preferably comprises a cover 811, held in extended position by engagement with the edge of the inspection table, and inside closing flaps 812 and 813. A retainer 81 hinged to the back 78 at 85 comprises an elongated and weighted head which engages the upper and outer portions of the container to hold it in the holder frame, from which it may be readily removed by lifting the retainer. The movement of retainer 81 about its pivot 85 is limited by the engagement of a pin 86 on the holder back 78 in an elongated slot 87 in the retainer.

Figure 8:
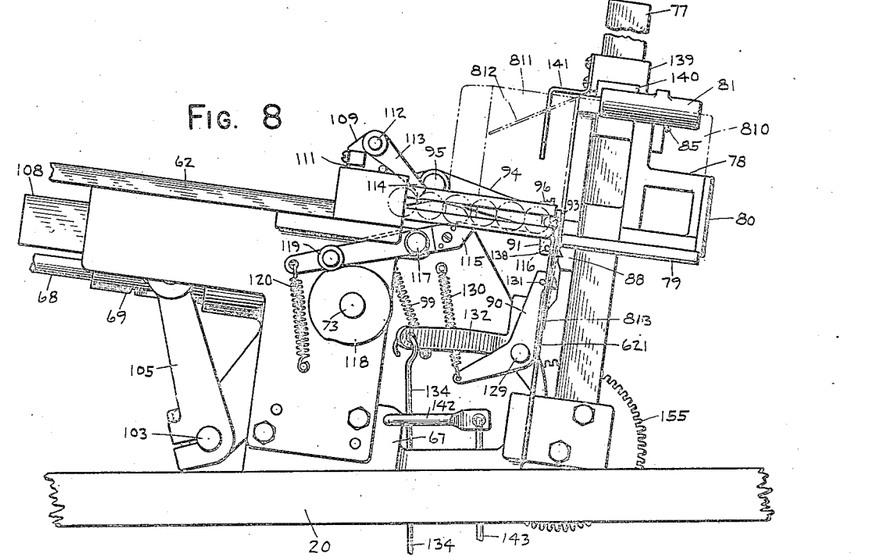
Fig. 8 is a front elevation of the mechanism shown in Fig. 2, the device for feeding a row of shells into the container being retracted and the retaining dog being in position to prevent the escape of shells from the inspection table.
Figure 9:
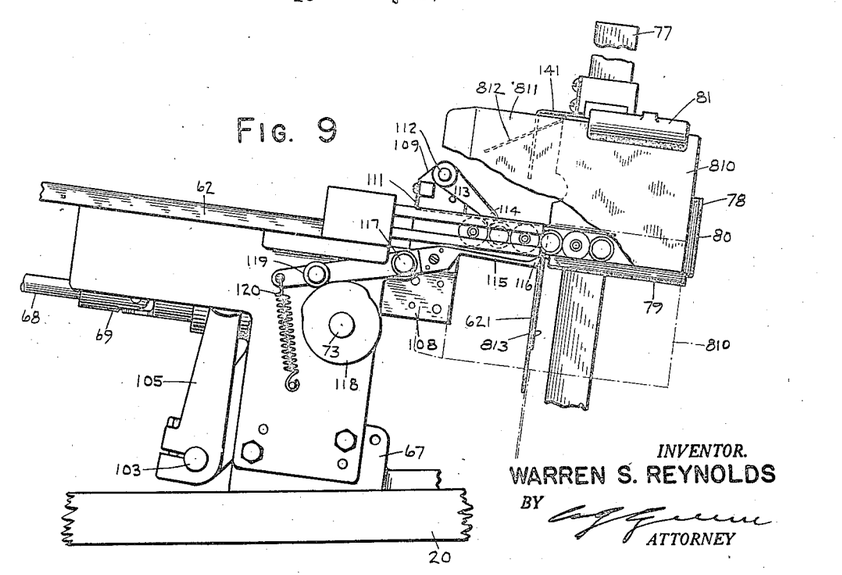
Fig. 9 is a view of a part of the mechanism shown in Fig. 8, showing the feeding device advancing to move a row of shells into the container.
Figure 10:
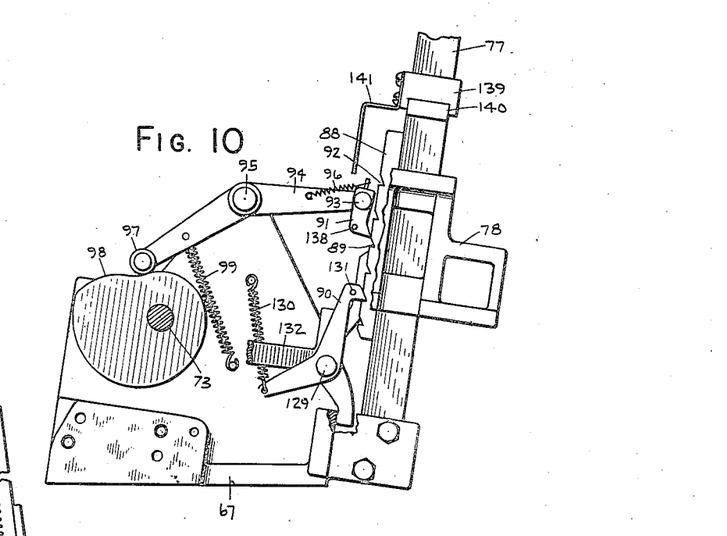
Fig. 10 is an elevation substantially on the line 10—10 of Fig. 2A.
Figure 11:
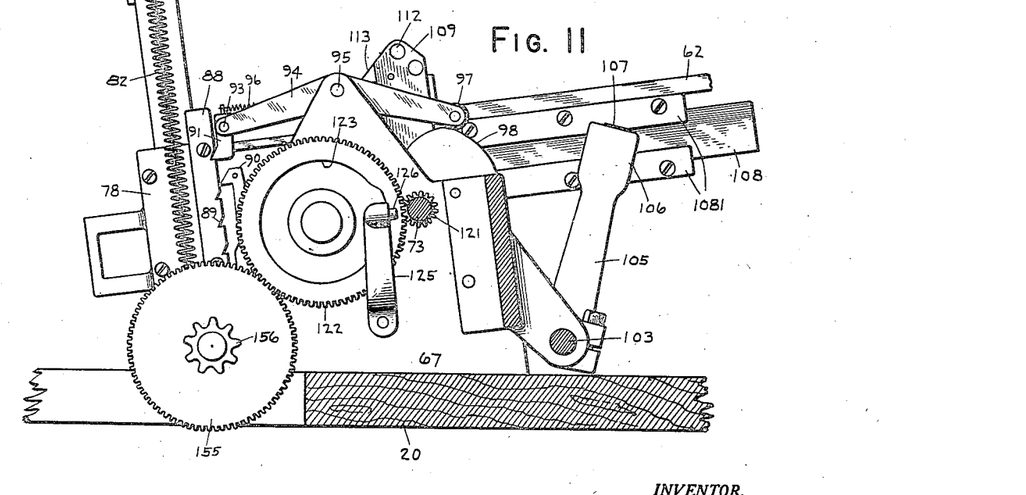
Fig. 11 is an elevation substantially on the line 11—11 of Fig. 2A.
Figure 12:
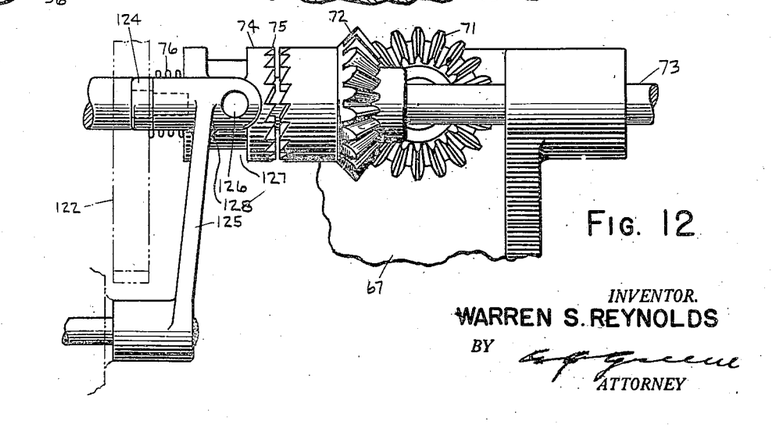
Fig. 12 is an elevation of the driving and clutch mechanism substantially on the line 12—12 of Fig. 2A.

The holder is drawn upwardly by a spring 82 tensioned between a stud 83 secured to the bar 77 and a stud 84 attached to the holder. The means for stopping the holder in a depressed position may comprise a ratchet plate 88 secured to the holder back 78 and provided with a series of upwardly facing shoulders or ratchet teeth 89 adapted to cooperate with pawls 90 and 91. Referring to Fig. 10, it will be noted that there are five teeth 89 which are equally spaced and a supplemental tooth 92 spaced at a greater distance from the uppermost of the teeth 89. When the receptacle holder is in its uppermost position, as illustrated in Fig. 8, the floor or bottom plate 79 is substantially in alignment with the inspection table 62. Both the table and the holder are inclined a sufficient amount to enable shells released from the inspection table to roll into the holder. However, means are provided for positively moving a group of shells into the holder, as hereinafter described. When the first group of shells has been thus placed in the holder it is necessary to depress the holder against the tension of spring 82 an amount substantially equal to the thickness of the row of shells therein. This is accomplished by means of the pawl 91. Said pawl is pivoted at 93 to a lever 94 pivoted at 95 in the supporting casting 67. Pawl 91 is urged to position to engage the ratchet teeth 89 and 92 by suitable means such as a spring 96. The opposite end of lever 94 carries a roller 97 drawn into engagement with the periphery of a cam 98 on shaft 73 by a spring 99. The throw of pawl 91 is equal to the spacing of tooth 92 from the uppermost tooth 89, hence it has a short idle movement (see Fig. 10) except when it engages tooth 92. The first four rotations of shaft 73 each depress the container holder by an amount equal to the spacing of the teeth 89, and it is held in successive depressed position by retaining pawl 90. The extra long step of movement between teeth 89 and tooth 92 is provided to carry a full container entirely below the level of the inspection table (broken line position, Fig. 9), and thus facilitate its removal. Means are provided, as hereinafter described, for disengaging the clutch 74 and thus stopping the machine as the container reaches its lowermost position. This condition is illustrated in Fig. 11. The holder is held down by pawl 91, roller 97 being engaged by the highest part of cam 98. The contents of the container are held therein by a plate 621 extending downwardly from the end of the inspection table 62, and secured near its lower end to casting 67. The operator may remove the container and contents by swinging the cover 811, lifting the retainer 81, and moving the container forward.

The mechanism for retaining the shells on the inspection table and for delivering them to a container on the container holder in successive groups as the container holder is depressed may be constructed as follows:

The shaft 73 carries a cam 100 controlling a cam follower lever 101 provided with a cam engaging roller 102 and fixed to a shaft 103 supported in brackets extending from the casting 67. A spring 104 holds the roller 102 in contact with the periphery of the cam 100. The opposite end of shaft 103 carries an arm 105 comprising a head 106 having a longitudinal groove for receiving a sliding block 107 apertured to receive a stud extending from a bar 108 adapted to reciprocate in a channel formed in part by plates 1081 in the casting 67. To the bar 108 is secured a vertically extending arm 109 and from the upper end of arm 109 certain supporting members extending forwardly above the inspection table. To one of these supports (Fig. 9) is secured a spring finger 111 which extends over a group of shells near the end of the inspection table to prevent their vertical displacement during movement into the container. To a second support 112 is pivoted a feed pawl 113 preferably comprising two fingers 114 spaced to provide clearance for the shell holding spring finger 111 and adapted to engage between adjacent shells on the inspection table in the manner illustrated in Figs. 8 and 9. The bar 108, and with it the feed pawl 113, reciprocates in each revolution of the shaft 73 a distance substantially equal to the depth of the container on the container holder, being advanced by spring 104 as the rotation of shaft 73 brings the low part of cam 100 opposite the cam following roller 102. The drawings illustrate a mechanism for packing a container with twenty-five shells in five rows of five each. Fig. 8 shows the feed pawl 113 in retracted position, five shells being ahead of the pawl in position to be thrust into the container, which is in its uppermost position, by the advancement of feed pawl 113. Fig. 9 shows the feed pawl in an intermediate position, the group of five shells being partly moved into the container. To hold the shells on the inspection table, except when they are being moved by the feed pawl 113, a holding finger or lever 115 having a slightly upturned end 116 is pivoted to the frame at 117 and controlled by a cam 118 on the forward end of shaft 73. The relation of cam 118 to cam 100 is such that the end 116 of finger 115 is lowered to release the shells just before the pawl 113 is moved to advance them. As the pawl 113 reaches the limit of its forward movement, a roller 119 on lever 115, which is held in engagement with cam 118 by a spring 120, rides off from the high part of cam 118, permitting spring 120 to again lift the end 116 of finger 115 into shell holding position.

It is necessary that the operations of shell feeding and container displacement be interrupted when each container is full, in order to permit the machine operator to remove the full container, restore the container holder to its uppermost position, and place an empty container thereon. For this purpose, means are provided for automatically disengaging the clutch 74 after the desired number of revolutions of the shaft 73 and the corresponding number of steps of movement of the container holder. Mechanism for this purpose may be constructed as follows:

To the shaft 73 is secured a pinion 121 which drives a gear 122 pivoted on a stub shaft extending from a plate of the casting 67. The pinion 121 and gear 122 are in the illustrative machine in a five-to-one ratio, the gear turning once for five revolutions of the pinion. Moved by the gear 122 and preferably formed as a part thereof is a cam 123 controlling a cam follower 124 associated with a lever 125 pivoted in the frame. Extending from lever 125 is a stud 126 received in a cam track 127 in the periphery of the clutch member 74. It will be remembered the clutch 74 is urged into engaging position by spring 76. The engagement of stud 126 with the active surface 128 of cam track 127 will withdraw the clutch, as clearly seen in Fig. 2A. The configuration of the cam 123 on gear 122 will, as shown in Fig. 11, permit the lever 125 to swing forward and cause the engagement of stud 126 in cam track 127 near the end of one revolution of gear 122 or five revolutions of pinion 121. Since the container is adapted to hold five layers of shells and one layer is inserted on each revolution of shaft 73 and pinion 121, it is apparent that the clutch will be disconnected and the machine stopped immediately after the container is full. The container holder is at this time in its lowermost position, and is held there by pawl 91 and cam 98 as heretofore described. The operator now removes the filled container and restores the container holder to its uppermost position. For this purpose, it is necessary to displace both pawls 90 and 91. Pawl 90 is an integral part of an elbow lever pivoted at 129 and urged to effective position by a spring 130. Extending rearwardly from the upper portion of pawl 90 is a pin 131 which stands in the path of movement of the upwardly extending arm of an elbow lever 132 likewise pivoted at 129. To the horizontally extending arm of elbow lever 132 is attached a link 134 extending downwardly through the table and suitably joined to a link 135 connected with an operating treadle 136. Link 134 and associated parts are drawn upwardly by a suitable spring such as 137. The vertically extending arm of elbow lever 132 is adapted to engage not only the pin 131 on pawl 90 but also a pin 138 on pawl 91. Thus, by depressing the treadle 136 and rocking the elbow lever, both pawls 90 and 91 are disengaged from the ratchet teeth 89, and the container holder is restored to its uppermost position by its spring 85, being stopped in said uppermost position by its engagement with a block 139 secured to the track bar 77. Preferably a buffer 140 of a suitable resilient material is secured to the top of the container holder and engages in a suitable recess in the block 139, as clearly shown in Fig. 8. Block 139 likewise supports a downwardly and forwardly extending finger 141 which guides the inner closing flap 812 as the container holder is lowered, preventing damage to this flap in the movement of the shell feeding pawl 113. The container holder being restored to its uppermost position and an empty container placed thereon, the machine is again set in operation by withdrawing the stud 126 on lever 125 from cam groove 127 in the clutch collar. For this purpose, lever 125 is secured to one end of a short shaft having a bearing in the supporting casting 67 and carrying at the opposite end an arm 142 to which is connected a link 143 extending through the bed of table 20 and joined to a link 144 drawn upwardly by a spring 145 and adapted to be depressed by the operation of a treadle 146. Upon the withdrawal of the stud 126, spring 76 thrusts the clutch member 74 into engagement with the constantly rotating pinion 72 and a second cycle of operation is initiated, which cycle will again be automatically interrupted when the container on the holder has been filled.

Figure 17:
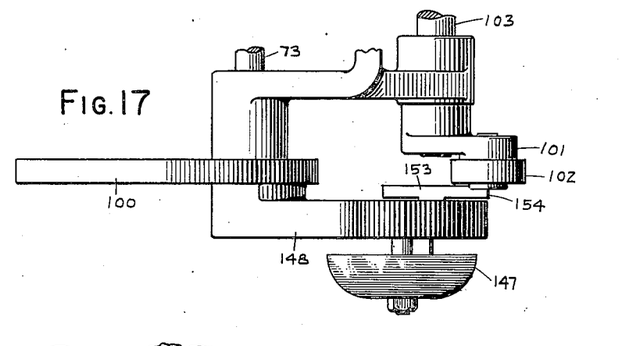
Fig. 17 is a plan view of the mechanism shown in Fig. 16.
Figure 18:
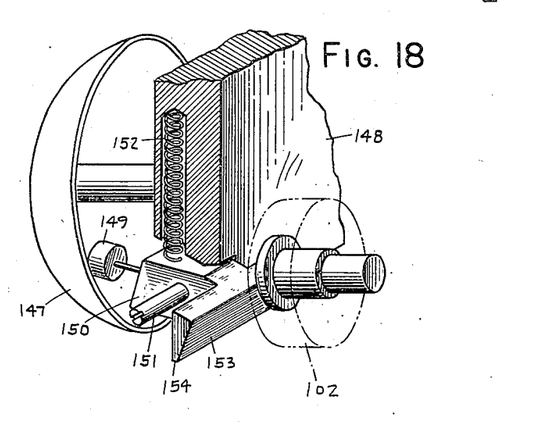
Fig. 18 is a detail of the bell-ringing device shown in plan in Fig. 17.

Means are provided for sounding an audible signal in the event that the feed pawl 113 has not performed its complete forward movement. It will be recalled that this pawl is advanced by the spring 104 to feed a row of shells into the container, its movement by the spring being permitted by the withdrawal of the high part of cam 100 in the revolution of shaft 73. If the movement of the feed pawl is obstructed and the pawl is stopped, the roller 102 will not follow the surface of the cam 100 to the low part thereof but will be held at an intermediate position corresponding to that in which the feed pawl has been stopped. For the purpose of warning the operator of this condition a bell mechanism comprising a bell 147 is provided, which may be conveniently secured to a counter-weight 148 joined to the cam 100 and rotating therewith about the shaft 78 as a center. The bell ringing mechanism is illustrated in detail in Figs. 17 and 18. The bell ringing device comprises a hammer 149 extending from a block 150 pivoted at 151 in the counter-weight 148 and normally held in contact with the bell by a compression spring 152. On the side of the counter-weight 148 adjacent the roller 102 on arm 101 the block 150 has a wedge-shaped head 153. As clearly shown in Fig. 17, this head stands opposite the lowest part of the cam 100 and is so spaced therefrom that if the roller 102 is in contact with the cam 100 the projecting end 154 of the roller shaft passes between the periphery of the cam and the wedge-shaped head 153 of the bell ringing device. However, if the roller 102 is held in any other position than in proper engagement with the periphery of cam 100 the part 154 will engage the edge or cam surface of the head 153 as illustrated in Fig. 17, rocking the member 150 about pivot 151 to compress the spring 152 and retract the hammer. As the part 154 moves past and releases the head 153 the hammer will be propelled against the bell.

Figure 2B:
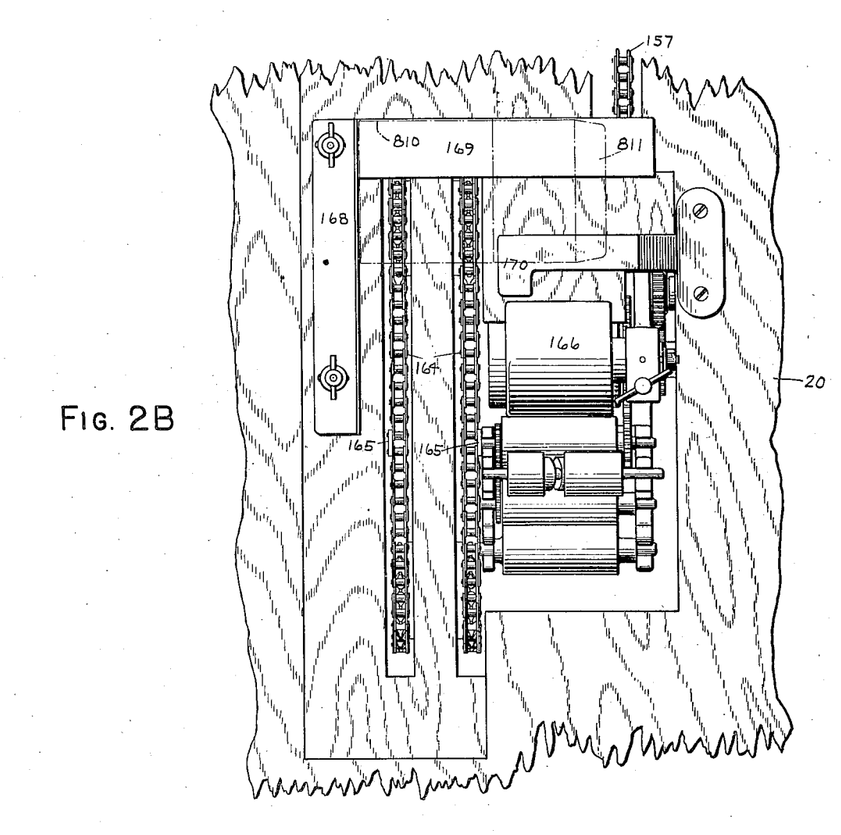
Fig. 2B is a plan view which is substantially a continuation of Fig. 2A, showing the printing mechanism and the container feeding devices operating in conjunction therewith.
Figure 13:
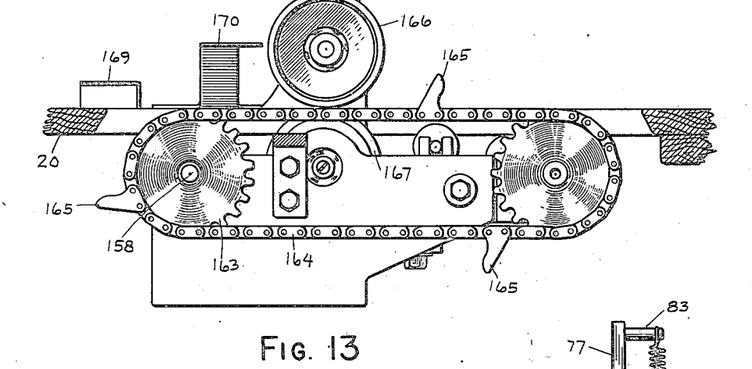
Fig. 13 is an elevation of the printing device and the mechanism for feeding containers thereto.
Figure 14:
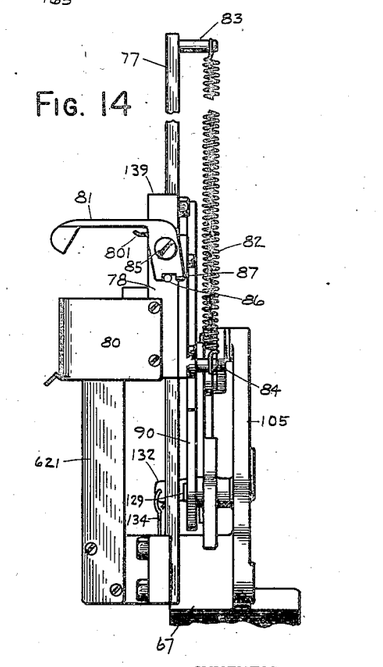
Fig. 14 is an elevation substantially on the line 14—14 of Fig. 2A.
Figure 15:
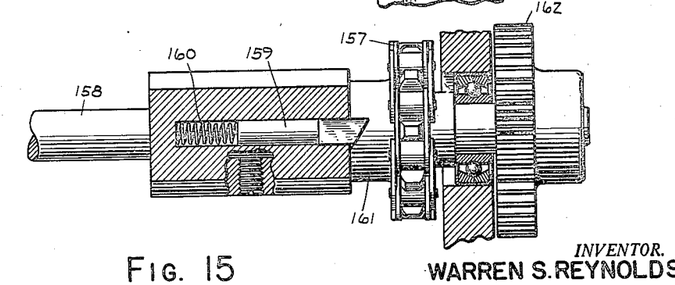
Fig. 15 is a detail of the printer clutch.
Figure 16:
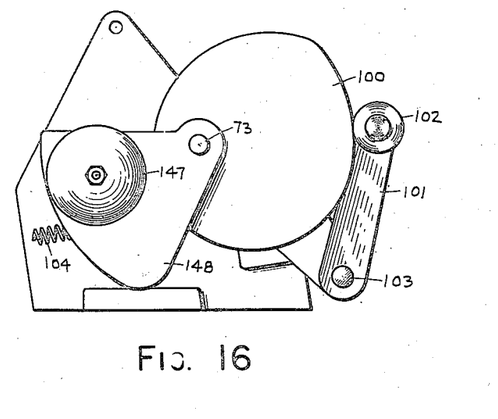
Fig. 16 is an elevation of the mechanism shown at the right of Fig. 2A.

Means are provided for operating a container feeding and printing mechanism in conjunction with the container filling or packing devices above described. It is desirable that certain data be imprinted upon the container in conjunction with the packing, such data to indicate certain characteristics of the contents, the date of packing, and other identification data if desired. For the purpose of operating print rolls and feeding the full containers thereto, there is provided a gear 155 meshing with the gear 122 and carrying a sprocket wheel 156. Said sprocket wheel supports a sprocket chain 157 (Figs. 2B and 15) loosely mounted on a shaft 158 and adapted to drive said shaft through a friction clutch mechanism comprising a plunger 159 urged by a spring 160 into a notch in the hub 161 of said sprocket wheel. Shaft 158 carries a gear 162 adapted to drive the inking and printing rolls illustrated in Fig. 2B. Said shaft 158 likewise carries sprocket wheels 163 receiving sprocket chains 164 carrying feeding lugs 165 (Fig. 13). The mechanism is arranged to print desired legends on the container covers, the covers being open as the containers are fed past the printing rolls by engagement with the feeding lugs 165. The operator, upon removing a filled container from the container holder of the packing unit, closes the inside flaps to retain the contents, leaving the cover open (see Fig. 9). A printing roll, as 167, is provided with the legend to be imprinted, the container cover passing between the printing roll and a presser roll 166. To properly align and position the container and cover, a positioning frame comprising bars 168 and 169 is secured to the table 20, and a cover holding finger 170 is arranged as shown in Fig. 2B. A container placed in the position shown in dotted lines in this figure will be picked up by lugs 165 and moved past the printer; the printer and lugs being connected in the manner described the printing point on each cover is the same. By reason of the one-way clutch 159 the printer may be manually operated independently of the packer, and thereafter automatically synchronized with the packer. The upper reaches of the sprocket chain 164 are substantially flush with the table surface, as clearly shown in Fig. 13, and the containers, having the covers properly imprinted, are delivered therefrom to the table in position for cover closing and removal.

The representative forms of the inventions herein described are to be understood as typical and illustrative only, said inventions being susceptible to embodiment in many other forms, all falling within the scope of the appended claims, which are to be broadly construed.

What is claimed is:

1. A machine for the packaging of cylindrical articles, comprising an inclined inspection table adapted to hold a row of said articles each in contact with adjacent articles, retractable means at the lower end of said table for retaining articles thereon, means for supporting a container in position to receive articles delivered from said inspection table upon the retraction of said retaining means, means for segregating a group of a predetermined number of articles adjacent the lower end of said inspection table comprising a pawl adapted to engage between the last article of the group and the adjacent article, and means for traversing said pawl to effect the delivery of the group of articles thus segregated to the container.

2. A machine for the packaging of cylindrical articles, comprising an inclined inspection table adapted to hold a row of said articles each in contact with adjacent articles, retractable means at the lower end of said table for retaining articles thereon, means for supporting a container in position to receive articles delivered from said inspection table upon the retraction of said retaining means, means for segregating a group of a predetermined number of articles adjacent the lower end of said inspection table comprising a pawl adapted to engage between the last article of the group and the adjacent article, means for traversing said pawl to effect the delivery of the group of articles thus segregated to the container, and means for retracting said retaining means concomitantly with the initial traversing movement of said pawl.

3. A machine for the packaging of cylindrical articles, comprising an inclined inspection table adapted to hold a row of said articles each in contact with adjacent articles, retractable means at the lower end of said table for retaining articles thereon, means for supporting a container in position to receive articles delivered from said inspection table upon the retraction of said retaining means, means for segregating a group of a predetermined number of articles adjacent the lower end of said inspection table comprising a pawl adapted to engage between the last article of the group and the adjacent article, means for traversing said pawl to effect the delivery of the group of articles thus segregated to the container, and means for retracting said retaining means concomitantly with the initial traversing movement of said pawl and for restoring said retaining means concomitantly with the movement of said pawl beyond said retaining means.

4. A machine for the packaging of cylindrical articles, comprising an inclined inspection table adapted to hold a row of said articles each in contact with adjacent articles, retractable means at the lower end of said table for retaining articles thereon, means for supporting a container in position to receive articles delivered from said inspection table upon the retraction of said retaining means, means for segregating a group of a predetermined number of articles adjacent the lower end of said inspection table comprising a pawl adapted to engage between the last article of the group and the adjacent article, means for traversing said pawl to effect the delivery of the group of articles thus segregated to the container, means for retracting said retaining means concomitantly with the initial traversing movement of said pawl and for restoring said retaining means concomitantly with the movement of said pawl beyond said retaining means, means for returning said pawl to its initial position, and means for shifting said container to position to receive a second group of articles during the restoring movement of said pawl.

5. A machine for the packaging of cylindrical articles, comprising an inclined inspection table adapted to hold a row of said articles each in contact with adjacent articles, retractable means at the lower end of said table for retaining articles thereon, means for supporting a container in position to receive articles delivered from said inspection table upon the retraction of said retaining means, means for successively segregating from the row of articles on said table groups of a predetermined number and for delivering each group as segregated to said container, said means comprising a pawl adapted for insertion between the body of the last article of the segregated group and the adjacent article, means for traversing said pawl to deliver each group of articles as segregated to the container, means for shifting the container between successive operations of said pawl, and means for interrupting the movement of said pawl after a predetermined number of operations thereof.

6. A machine for the packaging of cylindrical articles, comprising an inclined inspection table adapted to hold a row of said articles each in contact with adjacent articles, retractable means at the lower end of said table for retaining articles thereon, means for supporting a container in position to receive articles delivered from said inspection table upon the retraction of said retaining means, means for successively segregating from the row of articles on said table groups of a predetermined number and for delivering each group as segregated to said container, said means comprising a pawl adapted for insertion between the body of the last article of the segregated group and the adjacent article, means for traversing said pawl to deliver each group of articles as segregated to the container, means for shifting the container in equal steps of movement between successive operations of said pawl, means for interrupting the segregating and feeding movements of said pawl after a predetermined number of operations, and means for concomitantly shifting said container by an amount greater than said successive steps of movement.

7. A machine for the packaging of articles, comprising a container holder, a support for said container holder, a guide member secured to said container holder and slidably received on said support, a spring moving said container holder to an initial position on said support, a series of teeth associated with said container holder, a feed pawl adapted to cooperate with said teeth and to shift said container holder against the tension of said spring, a retaining pawl adapted to maintain said container holder in positions to which it is shifted by successive movement of said feed pawl, means for interrupting the movement of said feed pawl after a predetermined number of operations thereof, and manually operable means for withdrawing both said feed pawl and said retaining pawl to permit the restoration of said container holder to its initial position.

8. A machine for the packaging of articles, comprising a container holder, a support for said container holder, a guide member secured to said container holder and slidably received on said support, a spring moving said container holder to an initial position on said support, a series of equally spaced ratchet teeth associated with said container holder, a special tooth spaced from the end of said series by an amount greater than the spacing of the series, a feed pawl adapted for cooperation with said teeth, means for actuating said feed pawl to displace said container holder against the tension of said spring, a retaining pawl for retaining said container holder in the positions to which it is displaced by said feed pawl, the stroke of said feed pawl being equal to the spacing of said special tooth from the last tooth of said series, whereby the final movement of said container holder exceeds its other movements, and means for stopping said feed pawl at the end of said final movement and in engagement with said special tooth.

9. A machine for the packaging of articles comprising a table for holding a row of such articles, retractible means for retaining articles on the table, means for segregating a group of the articles on the table, a container holder, means for supporting the container holder with the floor of a container thereon substantially in alignment with said table, means for retracting the article retaining means, means for moving the segregated group of articles into the container, means for restoring said article retaining and group moving means, means for depressing the container holder to position the container thereon for receiving a second segregated group of articles, means for automatically repeating the cycle of operations until the container on the holder is full, means for depressing the full container to a position below the table, and means associated with the table for retaining articles in the container when the holder is thus depressed.

10. A machine for the packaging of articles comprising a table for holding a row of such articles, retractible means for retaining articles on the table, means for segregating a group of the articles on the table, a container holder, means for supporting the container holder with the floor of a container thereon substantially in alignment with said table, means for retracting the article retaining means, means for moving the segregated group of articles into the container, means for restoring said article retaining and group moving means, means for depressing the container holder to position the container thereon for receiving a second segregated group of articles, means for automatically repeating the cycle of operations until the container on the holder is full, means for depressing the full container to a position below the table, means for stopping the machine with the container holder thus depressed, means associated with the table for retaining articles in the container when the holder is thus depressed, and manually controlled devices for again setting the machine in operation.

11. A machine for the packaging of articles comprising a table for holding a row of such articles, retractible means for retaining articles on the table, means for segregating a group of the articles on the table, a container holder, means for supporting the container holder with the floor of a container thereon substantially in alignment with said table, spring propelled means for moving the segregated group of articles into the container, and means for actuating a signal when the group moving means fails to complete its movement.

12. A machine for the packaging of articles comprising a table for holding a row of such articles, retractible means for retaining articles on the table, means for segregating a group of the articles on the table, a container holder, means for supporting the container holder with the floor of a container thereon substantially in alignment with said table, means for retracting the article retaining means, means for moving the segregated group of articles into the container, means for restoring said article retaining and group moving means, means for depressing the container holder to position the container thereon for receiving a second segregated group of articles, means for automatically repeating the cycle of operations until the container on the holder is full, means for depressing the full container to a position below the table, means associated with the table for retaining articles in the container when the holder is thus depressed and thereupon stopping the machine, and manually controlled devices for restoring the container holder to its uppermost position and again starting the machine.

WARREN S. REYNOLDS.